United States Patent

Grosse Bley et al.

(10) Patent No.: US 8,899,099 B2
(45) Date of Patent: Dec. 2, 2014

(54) METHOD AND DEVICE FOR DETERMINING LEAKAGE

(75) Inventors: Werner Grosse Bley, Bonn (DE); Gerhard Küster, Köln (DE)

(73) Assignee: Inficon GmbH (DE)

( * ) Notice: Subject to any disclaimer, the term of this patent is extended or adjusted under 35 U.S.C. 154(b) by 320 days.

(21) Appl. No.: 13/516,806

(22) PCT Filed: Oct. 22, 2010

(86) PCT No.: PCT/EP2010/065984
§ 371 (c)(1),
(2), (4) Date: Jun. 18, 2012

(87) PCT Pub. No.: WO2011/076459
PCT Pub. Date: Jun. 30, 2011

(65) Prior Publication Data
US 2012/0261569 A1    Oct. 18, 2012

(30) Foreign Application Priority Data

Dec. 21, 2009    (DE) .......................... 10 2009 059 824

(51) Int. Cl.
G01M 3/40    (2006.01)
G01M 3/22    (2006.01)
G01M 3/20    (2006.01)

(52) U.S. Cl.
CPC .............. G01M 3/202 (2013.01); G01M 3/229 (2013.01)
USPC ........................................ 73/40.5 R; 73/49.1

(58) Field of Classification Search
CPC ................. F25B 2500/222; F24F 2011/0084; G01M 3/20; G01M 3/228

USPC .................. 73/40–49.8, 863, 863.11, 863.23, 73/864.71
See application file for complete search history.

(56) References Cited

U.S. PATENT DOCUMENTS

| | | | |
|---|---|---|---|
| 3,645,127 A | | 2/1972 | Mongodin et al. |
| 3,711,251 A | * | 1/1973 | Goodson et al. .............. 436/130 |
| 3,765,225 A | * | 10/1973 | Rivers ............................ 73/40.7 |
| 3,798,536 A | * | 3/1974 | Maillard et al. ............... 324/466 |
| 4,409,817 A | * | 10/1983 | Edwards, Jr. .................. 73/40.7 |
| 4,583,394 A | * | 4/1986 | Murakami et al. ............. 73/40.7 |
| 4,593,530 A | * | 6/1986 | Longsworth ................... 62/55.5 |
| 4,785,666 A | | 11/1988 | Bergquist |
| 4,791,805 A | * | 12/1988 | Gates ............................. 73/40.7 |

(Continued)

FOREIGN PATENT DOCUMENTS

| | | |
|---|---|---|
| DE | 10 2009 004 363 A1 | 12/1999 |
| DE | 10 2007 057 944 A1 | 1/2002 |

OTHER PUBLICATIONS

International Search Report/Written Opinion for PCT Application No. PCT/EP2010/065984; mailed Feb. 14, 2011; 9 pages.

*Primary Examiner* — David A Rogers
(74) *Attorney, Agent, or Firm* — Hiscock & Barclay, LLP

(57) ABSTRACT

In order to determine leakage on a device, which contains gas that can be condensed, an adsorbent is used through which ambient gas of the object is conducted. The adsorbed gas is desorbed by means of actuating an excitation device and fed to a gas sensor containing a mass spectrometer. In this way, minute amounts of leaking gas can be determined by means of accumulation. The method is in particular suited for use in the serial production of refrigeration machines.

8 Claims, 1 Drawing Sheet

(56) References Cited

U.S. PATENT DOCUMENTS

| | | | |
|---|---|---|---|
| 4,823,116 A * | 4/1989 | Kitchen et al. | 340/603 |
| 4,919,599 A * | 4/1990 | Reich et al. | 417/423.4 |
| 5,092,218 A * | 3/1992 | Fine et al. | 86/50 |
| 5,343,740 A * | 9/1994 | Myneni | 73/40.7 |
| 5,388,446 A * | 2/1995 | Kronberg | 73/40.7 |
| 5,490,413 A * | 2/1996 | Atkinson | 73/40 |
| 5,574,230 A * | 11/1996 | Baugh | 73/863.23 |
| 5,767,390 A * | 6/1998 | Chapman, IV | 73/40.7 |
| 5,767,391 A | 6/1998 | Wong | |
| 5,792,423 A * | 8/1998 | Markelov | 422/83 |
| 5,910,160 A * | 6/1999 | Cakmakci et al. | 62/195 |
| 6,244,117 B1 | 6/2001 | Mengel et al. | 73/863.21 |
| 6,314,793 B1 | 11/2001 | Webb et al. | |
| 6,354,135 B1 * | 3/2002 | McGee et al. | 73/23.34 |
| 6,354,160 B1 * | 3/2002 | Staples et al. | 73/863.12 |
| 6,520,033 B1 * | 2/2003 | Schroeder et al. | 73/863.12 |
| 6,920,802 B2 * | 7/2005 | Newbound | 73/863.23 |
| 7,299,710 B2 * | 11/2007 | Syage | 73/863.12 |
| 7,640,791 B2 * | 1/2010 | Bohm | 73/40.7 |
| 7,943,380 B2 * | 5/2011 | Westman et al. | 436/4 |
| 8,161,797 B1 * | 4/2012 | Genovese et al. | 73/31.03 |
| 8,176,770 B2 * | 5/2012 | Wetzig | 73/40.7 |
| 8,381,577 B2 * | 2/2013 | Bunod et al. | 73/40.5 A |
| 2001/0032521 A1 * | 10/2001 | Pawliszyn | 73/864.71 |
| 2003/0010093 A1 * | 1/2003 | Barjesteh | 73/40 |
| 2004/0107782 A1 * | 6/2004 | Bradley et al. | 73/864.34 |
| 2006/0174696 A1 * | 8/2006 | Komninos | 73/40.5 A |
| 2009/0314052 A1 * | 12/2009 | Rolff et al. | 73/1.06 |
| 2010/0313634 A1 | 12/2010 | Wetzig | |
| 2011/0083492 A1 * | 4/2011 | Chang | 73/40.5 R |
| 2011/0094290 A1 * | 4/2011 | Knobloch et al. | 73/23.41 |
| 2011/0283769 A1 | 11/2011 | Bohn et al. | |

* cited by examiner

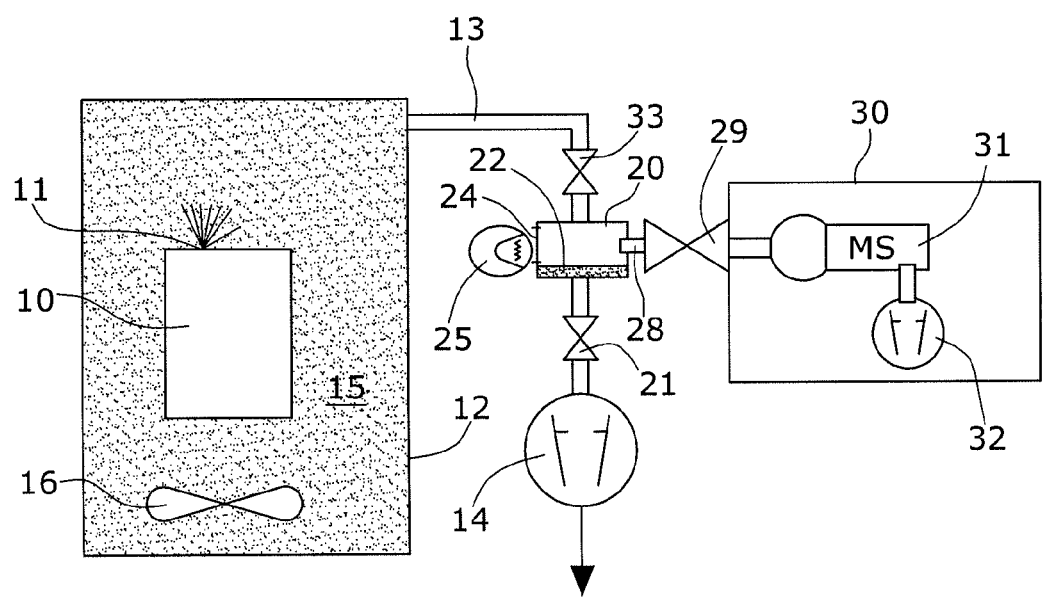

METHOD AND DEVICE FOR DETERMINING LEAKAGE

CROSS REFERENCE TO RELATED APPLICATIONS

Pursuant to 35 USC §371, this application is a National Stage of International Application No. PCT/EP2010/065984, filed Oct. 22, 2010, which claims priority to German Patent Application No. 102009059824.3, filed Dec. 21, 2009 under applicable paragraphs of 35 USC §119, wherein the entire contents of each above-noted document is herein incorporated by reference.

TECHNICAL FIELD

The invention refers to a method for leakage on a device, which contains gas that can be condensed, in particular a refrigerant, as well as to a corresponding device for determining leakage.

BACKGROUND OF THE INVENTION

In a series production of refrigerating systems, such as refrigerators or air conditioning systems, it is desirable to integrate a leak test at atmospheric pressure into the series production. Here, it is a particular difficulty that extremely low refrigerant concentrations in the ppb range have to be detected within a very short time span of several 10 seconds. Other gas-emitting hydrocarbons, such as those emitted by paints, solvents, lubricants or detergents, may create a disturbing background that must be eliminated by a corresponding selective measurement of the refrigerant. A bubble test in the context of an immersion test is hardly practicable, since irreversible damage to the apparatus under test may occur.

Currently, there is no technique with which a fully functional refrigerating system could integrally be checked for refrigerant leakage in a short time span in keeping with the cycle of a manufacturing line. In a makeshift approach the sites known as potential leak, such as soldering points, seals, valves and the like, are checked locally using a sniffer. This puts an extreme demand on the operator's care and attention.

SUMMARY

It is an object of the present invention to provide a method and a device for determining leakage on a device, which contains a gas that can be condensed, so that a safe and fast leak detection is possible despite the low concentration of the gas to be detected.

The method of the present invention is defined herein. This method provides that the ambient gas is passed from the environment of the apparatus across or through an adsorbent that adsorbs the condensable gas. Thereafter, the adsorbent is excited to desorb the adsorbed gas. The desorbed gas is then conducted to a gas sensor for a selective detection of the gas. According to the invention, the gas to be detected is accumulated on the adsorbent. After the adsorbent has been enriched, the excitation for the desorption of the adsorbed gas is performed, e.g. by heat radiation. The accumulated gas is drawn towards the gas sensor at a correspondingly elevated concentration. In this manner, a reliable measuring result can be obtained in an intermittent operation even with low gas concentrations, the result even allowing quantification. Such a measuring method is applicable along a manufacturing line without slowing down the production cycle. A first selection occurs during adsorption, since the adsorbent is bound selectively. A second selection is effected in the gas sensor which is a selective gas sensor that is not only able to detect gases but also to analyze these, such as a mass spectrometer, for instance.

According to the method of the present invention, first, a selective adsorption of the refrigerant in the sniffed gas is performed for a certain time span of, for instance, 20 seconds. This is followed by an abrupt desorption of the gas into a mass spectrometer in which a partial pressure shows on a specific mass profile of the refrigerant, which partial pressure can be measured in relation to the concentration time and the adsorption time. This partial pressure is a measure of the leakage rate. All interference gases, such as hydrogen or hydrocarbons, are suppressed by the fact that they show no intensity on the measured mass profile.

BRIEF DESCRIPTION OF THE DRAWINGS

The following is a detailed description of an embodiment of the invention with reference to the drawing.

FIG. 1 illustrates a schematic diagram of the embodiment.

DETAILED DESCRIPTION

The apparatus 10 to be subject to leak detection is an apparatus comprising a refrigerant circuit. The refrigerant may be, for example, R22, R410A, R134a and the like. In any case it is a condensable gas. In FIG. 1, the apparatus 10 is represented only schematically. The refrigerant circuit of the apparatus 10 is not specifically illustrated. Refrigerant escapes at a low leakage rate from a leak 11 in the apparatus.

In the present embodiment the apparatus 10 is located in a test chamber 12 into which it has been brought for testing purposes. The tightness of the test chamber 12 is such that no substantial loss of gas occurs during the predetermined accumulation time. No pressure difference exists so that the chamber needs no vacuum properties and may be of a very simple design, thereby offering considerable cost advantages. A suction line 13 connects the chamber 12 with a delivery pump 14, drawing the ambient gas 15 around the apparatus 10 from the test chamber. The test chamber 12 may include a blower 16 to improve the mixing of the ambient gas with the escaping leakage flow.

The test chamber 12 is not ultimately necessary. Instead of a test chamber, it may also be provided that the object or test sample is exposed to ambient atmosphere without any enclosure, an airflow being conducted in the ambient atmosphere along the entire surface of the non-enclosed test sample exclusively by drawing the air, as described in Patent Application DE 10 2009 004 363.

The suction line 13 leads to an adsorption chamber 20 connected with the delivery pump 14 through a first valve 21. The adsorption chamber 20 comprises a closed housing accommodating an adsorbent 22 through or around which the gas flows so that a large-surface contact is obtained. The adsorbent has to be selected purposefully so that refrigerant can be adsorbed. For instance, the adsorbent may be activated coal or zeolite. The activated coal may be made from coconut shells. Such material is available under the name ORBO. The adsorbent binds the refrigerant used, but also binds other gases. The selection is effected be the separation process in the selective gas sensor (e.g. a mass spectrometer). Another embodiment provides that the adsorption surface is cooled during the adsorption phase and that it is then heated to room temperature for desorption.

The adsorption chamber 20 has a window 24 of quartz glass or CaF. A heat radiator 25 in the form of a heating lamp is positioned in front of the window 24. The radiation of the heat radiator 25 is directed onto the adsorbent, whereby the adsorbent is excited for a desorption of the adsorbed gas. The desorption is initiated by the controlled activation of the heat radiator 25.

A line 28 including a second valve 29 leads from the adsorption chamber 20 to a gas sensor 30. Here, the gas sensor 30 is a mass spectrometer 31 with an associated high-vacuum pump 32. The gas is desorbed via the line 28 directly into the mass spectrometer 31.

During leak detection, ambient gas 15 is first drawn with the second valve 29 being closed and the first valve 21 being open. This operation is performed for a predetermined time, e.g. for 30 seconds. Here, the adsorption of the gas occurs in the adsorption chamber 20. Thereafter, the first valve 21 is closed and the second valve 29 is opened. A third valve 33 in the suction line 13 is closed. In this state, desorption is performed by activating the heat radiator 25. The gas is released from the adsorbent and flows into the mass spectrometer 31 under the action of the high-vacuum pump 32. In the gas sensor 30, the mass spectrometer 31 determines a quantitative measurand. For calibration, the entire process is performed under the same circumstances as in the later test for a known leak. From the resulting signal and the known leakage rate, a calibration factor is calculated by determining a ratio, the factor being applied to all future measurements.

When one test process is finished, the next test process is started, in which ambient gas 15 around the object 10 is first drawn through the adsorption chamber 20, while the second valve 29 is closed.

The invention claimed is:

1. A device for determining leakage on an apparatus which contains condensable gas, in particular, a refrigerant, comprising:
    a delivery pump that draws ambient gas from the environment of the apparatus and conducts the same through an adsorption chamber containing an adsorbent;
    a gas sensor connected to the adsorption chamber for selectively detecting the condensable gas; and
    a controllable excitation device for exciting the adsorbent for the description of the adsorbed gas, wherein the adsorption chamber is connected to the delivery pump via a first valve and to the gas sensor via a second valve, said device including a control means that closes the second valve during the adsorption phase and opens said valve during the desorbtion phase.

2. A method for determining leakage on an apparatus which contains condensable gas, in particular a refrigerant, the method comprising the steps of:
    i) drawing ambient gas from the environment of the apparatus;
    ii) conducting the ambient gas through an adsorbent which adsorbs the condensable gas;
    iii) exciting the adsorbent for the desorbtion of the adsorbed gas;
    iv) conducting the desorbed gas to a gas sensor for a selective detection of the gas; and
    v) determining a quantitative measure in the gas sensor, which, after calibration by means of a test leak, indicates a leakage rate.

3. The method of claim 2, wherein the exciting step is performed by heating.

4. The method of claim 3, wherein heating is effected by means of a heat radiator.

5. The method of claim 2, wherein the step of conducting the ambient gas through the adsorbent is terminated, prior to the exciting step.

6. The method of claim 2, wherein the adsorbent is cooled during adsorption.

7. The method of claim 2, wherein the gas sensor comprises a mass spectrometer, a vacuum being generated for the operation of the same, with the desorption being directed directly into the vacuum of the mass spectrometer.

8. The method of claim 2, wherein the apparatus is positioned in a test chamber containing the ambient gas.

* * * * *